E. V. HAGMAN.
PROTRACTOR.
APPLICATION FILED MAY 15, 1916.
1,229,069.
Patented June 5, 1917.
2 SHEETS—SHEET 1.
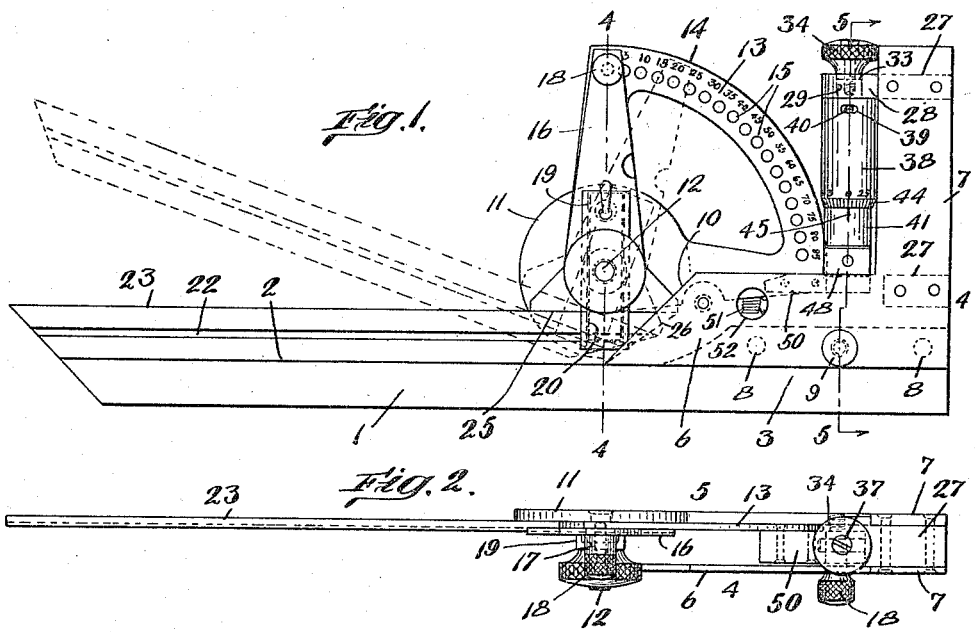
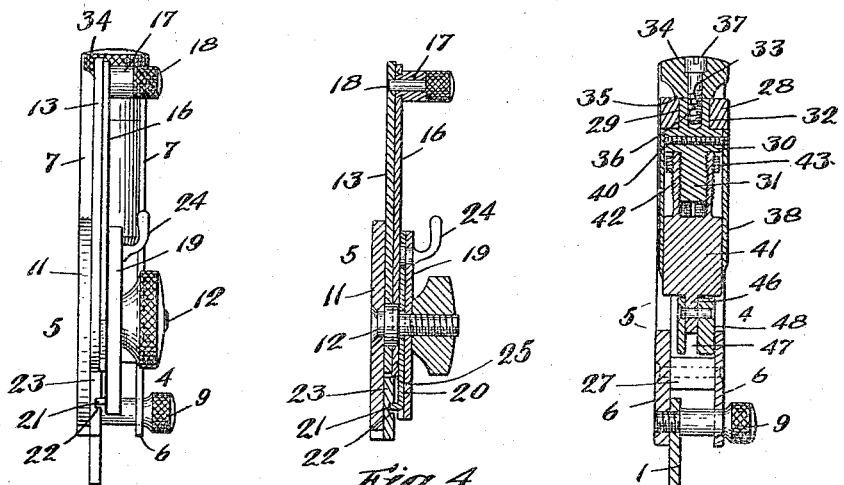
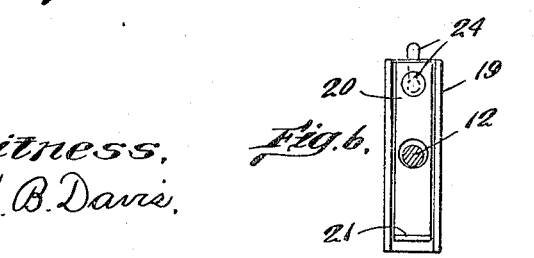
Witness.
H. B. Davis.
Inventor.
Edwin V. Hagman
By Norys & Harriman
attys.

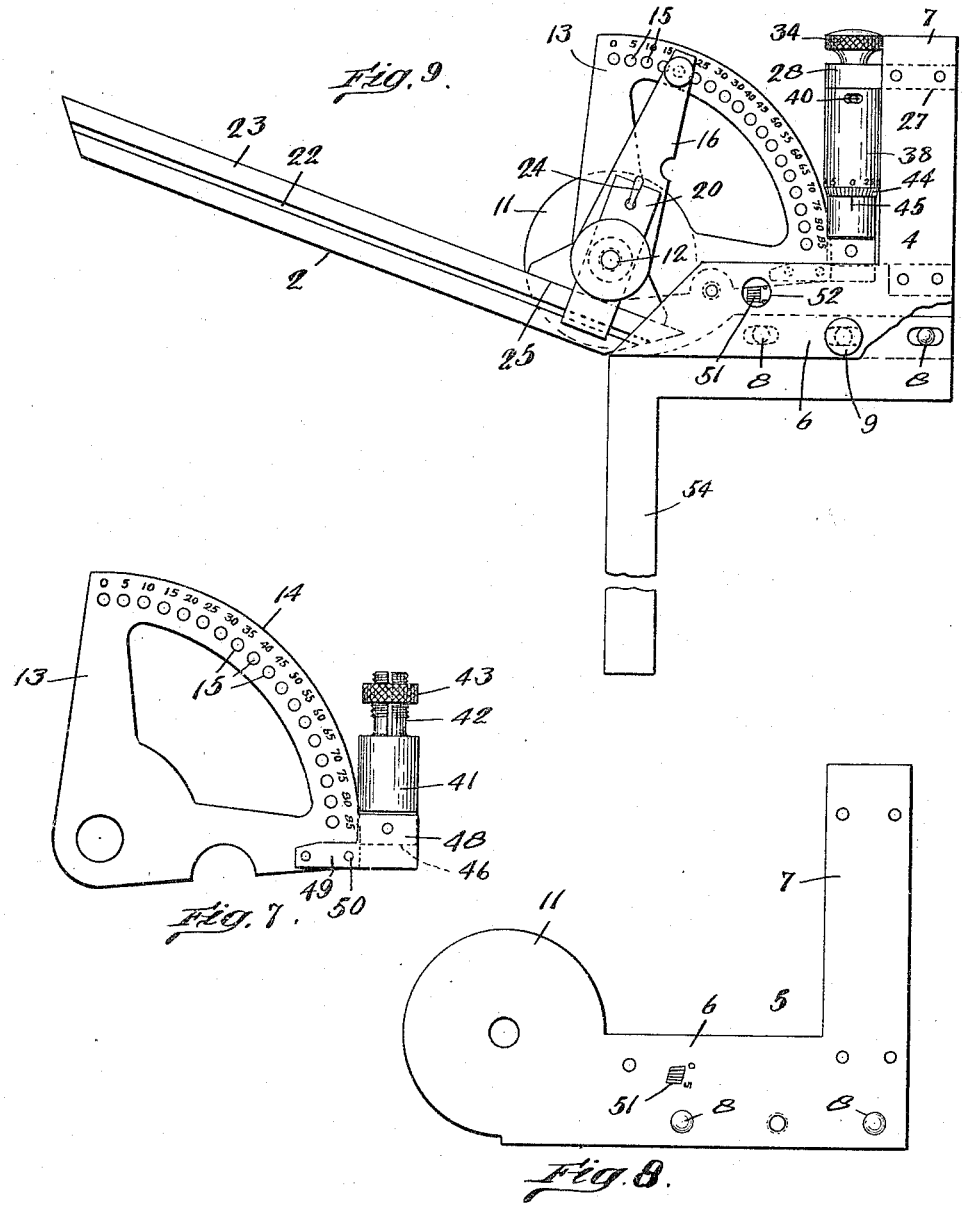

UNITED STATES PATENT OFFICE.

EDWIN V. HAGMAN, OF REVERE, MASSACHUSETTS.

PROTRACTOR.

1,229,069.   Specification of Letters Patent.   Patented June 5, 1917.

Application filed May 15, 1916. Serial No. 97,505.

*To all whom it may concern:*

Be it known that I, EDWIN V. HAGMAN, a citizen of the United States, residing at Revere, in the county of Suffolk and State of Massachusetts, have invented an Improvement in Protractors, of which the following is a specification.

This invention relates to an improvement in protractors, and generally to the adjustment of angular relations between the fixed and movable rule edges.

In protractor work, it is at times of great importance that the adjustment or set of the rule edges of two or more protractors be absolutely identical, and in the general type of adjusting means for the present protractor identical adjustment of any two or more protractors is practically impossible. This is largely incident to the fact that the adjusting means of such protractors is manipulated through a single element, and that by reason of relatively different play in different protractors, and the necessary use of the eye only as a guide in registering the scale works for such adjustment, absolutely uniform accuracy is practically impossible.

One of the objects of the present invention is to provide a means of adjustment for the protractor which will necessitate, in practically all adjustments, the use of individual adjusting members, one of the ordinary pivot or swinging type for comparatively large adjustments, say in variations of five degrees, and the other a micrometer screw adjustment for variations in parts of a degree as minutes, the construction also contemplating the usual vernier attachment for seconds adjustment.

The use of the minutes adjustment through a micrometer screw connection insures absolute accuracy in the final set and further permits any two or more protractors to be readily set with absolute identical accuracy.

Another object of the invention is the provision of means whereby the movable rule edge is adjustable with respect to the degree adjusting means, in order that said rule edge may be utilized for normally including angles of exceeding 90°, the structure being also adapted to coöperate with fixed rule edges of relatively different angular relation in order that the protractor at normal position may present any fixed degree of angular relation between such rule edges in the normal positions of the adjusting means.

In the drawings:—

Figure 1 is a side elevation of my improved form of protractor.

Fig. 2 is a plan view.

Fig. 3 is an end elevation.

Fig. 4 is a section taken on line 4—4 of Fig. 1.

Fig. 5 is a section taken on line 5—5 of Fig. 1.

Fig. 6 is an enlarged detail of the key plate.

Fig. 7 is an enlarged detail of the gage sector.

Fig. 8 is an enlarged detail of the back plate.

Fig. 9 is a side elevation of the protractor showing the modified form of ruling edge.

In the detail view illustrated, 1 represents what may be termed the fixed rule edge comprising an elongated strip of a substantially narrow width for the greater portion of its length, such portion of narrow width being provided with a proper ruling edge surface 2. Beyond the rule edge surface, the strip is widened to form what may be termed a holding section 3.

Secured to opposite sides of the holding section 3 of the fixed rule edge are front and rear face plates 4 and 5. Each of the plates 4 and 5, hereinafter referred to, respectively, as the face plate and back plate, include sections 6 and 7 disposed at right angles to each other, the sections 6 being designed to be secured to the bearing portion of the fixed rule edge, while the sections 7 extend at right angles thereto. The plates 4 and 5 are secured to the fixed rule edge by pin and hole connections 8, accurately positioning the parts, provision being made for removably securing these parts in such relative positions through the use of a clamping nut of the usual head form, as 9. The relatively forward edge of the section 6 of the face plate proper is cut away at 10 in order to provide proper clearance for the locking nut of the pin 12, while the section 6 of the back plate is provided in that portion disposed in advance of the cut-away portion of the face plate, which is provided with an approximately circular supporting section 11.

A pivot pin 12 is centrally fixed and projects laterally of the bearing portion 11, and on the pivot pin in surface contact with the bearing portion is arranged a gage sector 13, the curved edge 14 of which is disposed beyond the bearing portion and is formed with a successive series of openings 15 spaced apart to correspond to five-degree adjustments each. On the pivot pin overlying the gage sector is an adjusting arm 16 preferably gradually reduced in width from its pivot connection to its upper end, the free end of the adjusting arm overlying and bearing upon one surface of the scale portion of the gage sector, and being provided in line with the openings 15 with a fixed lateral extending sleeve 17 in which is mounted for limited independent longitudinal movement, a locking pin 18. The head of the pin is knurled beyond the free end of the sleeve while the reduced length of the pin provides a portion to be slidably and rotatably mounted in the sleeve, being of such length that the terminal end thereof will extend beyond the relatively inner surface of the arm to seat in any one of the openings 15 as may be necessary in the adjustment of the arm. A clamp head nut is arranged upon the pivot pin 12 to secure the parts. Secured to the outer surface of the arm is a guide block 19 with side edges or walls of such depth as to space the main portion of the block from the arm. The block is so positioned relative to the arm that the lower portion thereof extends below the lower edge of the arm, and slidably arranged in the arm is a key plate 20 having its lower terminal presenting a latertally projected key 21. The key plate is arranged within the arm so that the key may engage a keyway 22 formed in the movable rule edge 23. The key plate and guide block are locked with relation to each other through the medium of a handle operated lock or pin 24 passing through the openings in the guide block and key plate and taking into the arm, that portion of the locking pin engaging the key plate being slightly eccentric and coöperating with the similar opening in the key plate in order that as the locking pin is turned to locking position, the relatively upper edge of the movable rule edge 23 may be drawn accurately and snugly against the relatively lower edge 25 of the adjusting arm, in order that said movable rule edge may have an absolutely accurate right angle disposition with respect to the arm to insure that the meeting line of the rule edges shall be perfectly true when the parts are in normal positions or in closed relation. The relatively rear end of the movable rule edge or that end adjacent the adjusting arm is cut away at 26 to permit necessary movement of said rule edge without interference, as will be seen from Fig. 1 of the drawings.

The parts described constitute the main or degree adjustment of the protractor, it being obvious that by releasing the pin 18 from coöperation with the normal or zero marked degree hole 15, in which positions the operative edges of the rules are in coincidence, and turning arm on its pivot, so that the pin 18 registers with the hole 15 marked to correspond to the particular degree desired, the movable rule edge will be correspondingly moved so that the operative edge thereof will present an angular relation to the operative edge of the fixed rule corresponding with that degree.

In the adjustment of protractors "minute" adjustments are of particular importance, and hence the present invention contemplates the use of additional adjusting means for such minute adjustments. As such minute adjustments are necessary, and as experience has proven that it is practically impossible to use a micrometer adjustment for the whole 90 degrees of the degree adjustment as well as for the minute adjustment and insure uniform and certain accuracy, this invention provides for the degree or greater adjustment by one member and utilizes the separate micrometer means for the minute adjustment only. Under these circumstances, the micrometer adjustment is at all times less than a five degree adjustment, or in other words, the micrometer minute adjustment, as such, may be used at any point in the degree adjustment so that the micrometer minute adjustment is a necessarily limited movement, and hence its accuracy is more readily provided for and maintained in initial or succeeding adjustments than would be otherwise possible, as a greater length of micrometer screw, for degree adjustment, would result in variations.

In providing for the micrometer minute adjustment there is provided between the upright or vertical section 7 of the back and face plates what may be termed spacing strips 27, the upper one being extended in advance of the relative inner edges of such portions of the back and face plates in the form of a supporting strip 28 formed with an opening 29. A turning plug is designed to be passed through the opening 29 and bear against the lower surface thereof. The plug includes a disk-like bearing member 30 having a depending micrometer screw threaded portion 31 and an upwardly projecting barrel 32 adapted to be passed through the opening 29, and accurately register therewith, the upper end of the barrel having a transverse diamertically located slot 33. The relatively upper surface of the bearing disk 30 is accurately formed to squarely bear against the lower surface of the strip 28, and the length of the barrel is accurately equal to the thickness of the strip 28, so that the upper surface of the barrel is exactly flush with the upper surface of the strip. An operating head 34 is formed so that its lower surface 35 rests squarely and accurately upon the upper surface of the strip, the head having a depending lug 36 to seat in the recess 33 of the barrel. A securing bolt 37 is passed through the head and threaded into the appropriately formed axial opening in the barrel, so that when tightened, the operating head and micrometer screw are connected with an absolutely accurate square bearing on the respective upper and lower surfaces of the supporting strip to prevent the possibility of other than a relatively rotative movement. A minute gage member 38 is secured to and carried by disk 30 of the micrometer screw, being designed to be adjustable with relation thereto in order that an accurate initial setting of the parts may be secured when desired. This adjustable connection is provided through a slot 39 formed in the minute gage member, which gage member is of cylindrical hollow sleeve-like form, through which slot is passed a set screw 40 taking into the disk member 30 of the micrometer screw, and bearing, when set, against the diametric surface of the gage member with a clamping effect. The length of the slot permits an obvious adjustment of the minute gage member with respect to the micrometer screw for initial setting or subsequent adjustment.

The operating element for the micrometer screw is in the form of a cylindrical block 41 having extended upwardly therefrom a divided sleeve-like extension 42 interiorly threaded for coöperation with the micrometer screw and exteriorly threaded to receive a clamping section or ring 43. The micrometer threaded surface on the sleeve 42 is slightly inclined in the normal relation of the split sections, so that a clamping action is had on the screw by the ring 43, and an absolutely accurate adjustment of the threads of the sleeve and micrometer screw is insured to guard against the possibility of other movement than that incident to such threaded action. The lower edge of the minute gage is formed with a series of graduations or scale marks 44, but owing to the limited circumferential area of the minute gage and of liability to confuse in the event 60 minute marks were used throughout such area, it is preferred that 30 of such marks be used, so that a complete rotation of the minute scale gage corresponds in minutes to but one-half of one degree. The barrel 41 of the coöperating micrometer screw member slidably operates and extends some distance below the minute gage and is provided with a center or gage mark 45 with which the minute scale or graduations 44 coöperate for adjustment.

The extreme lower end of the barrel is provided with a diametrically disposed depending lug 46, and said lug engages a slot 47 in a connector 48, the reduced lateral strip 49 of which is connected at 50 to the lower free edge of the degree scale.

With this arrangement it will be apparent that the micrometer adjustment throughout the minutes necessary will vary the degree adjustment member as an entirety, and in accordance with the desired minute adjustment, thus adjusting the movable rule edge to the fixed rule edge in minutes.

As previously stated, the independent adjustment of the minute gage through slot 39 and screw 40 permits an accurate registry of the guide mark 45 with the zero of the scale 44 in initial setting thereby guarding against possibility of an error in this respect.

In connection with the minute adjustment there is also provided degree adjustment which includes suitable scale graduations 51 on the back plate, the adjusting member for coöperation with such scale graduations being provided by the lower edge of the degree scale quadrant. The face plate 4 is formed with an opening 52 through which the scale graduations 51 are visible.

As an addition to the construction described, I contemplate the addition of fixed rule edges having the rule edge normally disposed at an angular relation to the movable rule edge when the latter is in normal position, enabling the protractor with such fixed rule edges, to normally present a predetermined angle without adjustment. Under these circumstances, as illustrated in Fig. 9 of the drawings, the fixed rule edge will have the operative extension or strip thereof disposed at an angle to the connecting portion 3, as for example, a right angle as shown at 54, under which circumstances the angular relation of the movable and fixed rule edges, when in normal position, will be that of a right angle.

The structure described is particularly arranged to enable the degree or main adjustments to be readily and quickly secured and the accurate or minute adjustments to be secured under micrometer movement, which will insure their accuracy, and this without entailing a micrometer screw of such length as will interfere with its accuracy. The various operating parts particularly where movement is desired are as is usual in this type of device, to be accurately mounted and fitted in order that movement other than that designed for adjustment is practically prevented, and this result is secured in the structure described as the minute or final adjustments to determine the desired angle with absolute accuracy are necessarily of smaller relative movement and hence, with initial accurate fitting wear by reason of such small movement, is reduced to a minimum.

I claim:—

1. A protractor having a fixed rule edge, an adjustable arm pivotally mounted thereon, a degree adjusting member with which the arm is relatively movable for adjustment and to which the arm is fixed when adjusted, said degree adjusting member being pivotally mounted on the fixed rule edge, a micrometer adjusting member mounted on the fixed rule edge and connected with the degree adjusting member for minute adjustment of said member and arm and a movable rule edge carried by the arm.

2. A protractor comprising a fixed rule edge, a degree scale rotatably supported thereon, an adjusting arm rotatably supported on the fixed rule edge and a movable rule edge secured to said arm, the position of the arm being movable with respect to the degree scale to vary the adjustment of the movable rule edge with respect to the fixed rule edge in degrees, said arm being fixed to the degree scale when adjusted, a micrometer adjuster secured to the fixed rule edge and connected to the degree scale to move the latter with the fixed arm and movable rule edge for minute adjustment.

3. A protractor comprising a fixed rule edge, a face plate secured to one side thereof, a back plate secured to the opposite side thereof, the face and back plate having alined angular extensions, a degree scale pivotally mounted on the back plate, an arm pivotally mounted on the back plate, a movable rule edge, clamping means connecting the movable rule edge to the arm, the arm with the movable rule edge being adjustable with respect to the degree scale to vary the angular inclination of the respective rule edges in degrees, said arm and movable rule edge being fixed to the degree scale when adjusted, a micrometer adjusting member supported by the angular portions of the face and back plate and a connection between the micrometer adjusting member and the degree scale to move the latter and the arm for minute-angular and movable rule edge variation with the fixed rule edge.

4. A protractor including a fixed rule edge, plates secured thereto, adjacent one end and having right angle portions, a degree scale pivotally mounted on one of the plates and formed with holes indicating degree adjustments, an arm arranged upon the pivot of the degree scale and formed with a member to engage any one of the holes in the degree scale and to fix the arm to the degree scale when adjusted, a guide secured upon the arm, a slide movable in the guide and formed with a lateral extension, a movable rule edge having a slot to receive the lateral extension of the slide, means for clamping the slide in the guide to arrange the movable rule edge in the fixed relation to the arm, and a micrometer adjusting member carried by the right angle portions of the plates and connected to the degree scale, said micrometer adjusting member moving the degree scale, arm, and movable rule edge for minute adjustments between said rule edges.

5. A protractor comprising a fixed rule edge, plates secured thereto adjacent one end and having right angle portions, a degree scale pivotally mounted on one of the plates and formed with holes indicating degree adjustments, an arm arranged on the pivot of the degree scale and having a member to engage any one of the holes in the degree scale, to secure the arm to the degree scale when adjusted, a movable rule edge carried by the arm, and movable therewith on the degree scale to vary the angular relation between the movable and fixed rule edges, and a micrometer adjustment carried by the right angle portions of the plates and comprising a micrometer screw mounted for rotary movement with respect to the plates, a scale gage fixed to the screw and bearing minute scale indications, a block slidable within the sleeve and having threaded coöperation with the micrometer screw, and a connection between the barrel and degree scale to move the degree scale, connected arm, and movable rule edge in the micrometer adjustment of the barrel.

6. A protractor comprising a fixed rule edge and a movable rule edge, a degree adjusting means movably mounted on the fixed rule edge and comprising a degree scale and an arm adjustable with relation thereto and carrying the movable rule edge, and a micrometer adjusting member connected to the degree scale to move the latter, and arm, and movable rule edge for micrometer adjustment, the micrometer including a bearing block having fixed relation to the fixed rule edge, a micrometer screw having an enlargement to bear against the one surface of the block, an operating head for the screw bearing against the opposite side of the block and connected to the micrometer screw, the connections providing an accurate bearing for the operation of the micrometer screw, a minute scale gage formed as a sleeve provided with a slot encircling the enlargement of the micrometer screw and having an adjustable connection therewith, a set screw passing through the slot in the sleeve and through the enlargement and bearing against the sleeve diametrically opposite the slot, a block longitudinally movable in the sleeve and extending below the same and connected to the degree scale, the surfaces of the block and sleeve being worked to provide a minute scale adjustment, the block within the sleeve having a threaded extension to receive the micrometer screw, said threaded extension being longitudinally split and exteriorly threaded to receive a clamping ring for binding threaded connection between the extension and screw to prevent other than a movement due to the threaded connection.

In testimony whereof, I have signed my name to this specification in the presence of two subscribing witnesses.

EDWIN V. HAGMAN.

Witnesses:
H. B. DAVIS,
B. J. NOYES.

Copies of this patent may be obtained for five cents each, by addressing the "Commissioner of Patents, Washington, D. C."